United States Patent [19]
Sayko

[11] Patent Number: 4,485,388
[45] Date of Patent: Nov. 27, 1984

[54] COMPACT PRINT HEAD

[75] Inventor: Steven P. Sayko, Dryden, N.Y.
[73] Assignee: NCR Corporation, Dayton, Ohio

[21] Appl. No.: 400,543
[22] Filed: Jul. 21, 1982
[51] Int. Cl.[3] ..................... G01D 15/18
[52] U.S. Cl. ..................... 346/140 R
[58] Field of Search ..................... 346/75, 140 R

[56] References Cited

U.S. PATENT DOCUMENTS 4,021,818 5/1977 VanVloten ..................... 346/140 R
4,095,238 6/1978 Kattner et al. ..................... 346/140 R
4,271,416 6/1981 Shimizu et al. ..................... 346/140 R
4,308,546 12/1981 Halasz ..................... 346/140 R

FOREIGN PATENT DOCUMENTS 55-49272 4/1980 Japan ..................... 346/140 R

*Primary Examiner*—E. A. Goldberg
*Assistant Examiner*—Gerald E. Preston
*Attorney, Agent, or Firm*—J. T. Cavender; Wilbert Hawk, Jr.; George J. Muckenthaler

[57] ABSTRACT

A circuit board is utilized to hold a plurality of ink droplet producing elements in compact manner and conductive portions of the board are connected to actuate the elements in pulse-on-demand type printing.

12 Claims, 4 Drawing Figures

COMPACT PRINT HEAD

BACKGROUND OF THE INVENTION

In the field of non-impact printing, the most common types of printers have been the thermal printer and the ink jet printer. When the performance of a non-impact printer is compared with that of an impact printer, one of the problems in the non-impact machine has been the control of the printing operation. As is well-known, the impact operation depends upon the movement of impact members, such as print hammers or wires or the like, which are typically moved by means of an electromechanical system and which may, in certain applications, enable a more precise control of the impact members.

The advent of non-impact printing, as in the case of thermal printing, brought out the fact that the heating cycle must be controlled in a manner to obtain maximum repeated operations. Likewise, the control of ink jet printing, in at least one form thereof, must deal with rapid starting and stopping movement of the ink fluid from a supply of the fluid. In each case of non-impact printing, the precise control of the thermal elements and of the ink droplets is necessary to provide for both correct and high-speed printing.

In the matter of ink jet printing, it is extremely important that the control of the ink droplets be both precise and accurate from the time of formation of the droplets to depositing of such droplets on paper or like record media and to make certain that a clean printed character results from the ink droplets. While the method of printing with ink droplets may be performed in either a continuous manner or in a demand pulse manner, the latter type method and operation is disclosed and is preferred in the present application when applying the features of the present invention. The drive means for the ink droplets is generally in the form of a well-known crystal or piezoelectric type element to provide the high-speed operation for ejecting the ink through the nozzle, while allowing time between droplets for proper operation. The ink nozzle construction must be of a nature to permit fast and clean ejection of ink droplets from the print head.

In the ink jet printer, the print head structure may be a multiple nozzle type with the nozzles aligned in a vertical line and supported on a print head carriage which is caused to be moved or driven in a horizontal direction for printing in line manner, while the ink droplet drive elements or transducers may be positioned in a circular configuration with passageways leading to the nozzles.

Alternatively, the printer structure may include a plurality of equally-spaced, horizontally-aligned, single nozzle print heads which are caused to be moved in back-and-forth manner to print successive lines of dots in making up the lines of characters. In this latter arrangement, the drive elements or transducers are individually supported along a line of printing.

In a still different structure, the nozzles are spaced in both horizontal and vertical directions, and the vertical distance between centers of the ink jets equals the desired vertical distance between one dot and the next adjacent dot above or below the one dot on the paper. The horizontal distance is chosen to be as small as mechanically convenient without causing interference between the actuators, reservoirs, and feed tubes associated with the individual jets. The axes of all jets are aligned approximately parallel to each other and approximately perpendicular to the paper. Thus, if all nozzles were simultaneously actuated, a sloped or slanted row of dots would appear on the paper and show the dots spaced both horizontally and vertically. In order to produce a useful result consisting of dots arranged as characters, it is necessary to sweep the ink jet head array back and forth across the paper, and to actuate each individual nozzle separately when it is properly located to lay down a dot in the desired position. A vertical row of dots is created by sequentially actuating the nozzles rather than simultaneous actuation thereof, the latter being the preferred practice in the more common nozzle arrangements.

In the concept of dot matrix printing, it is generally desired to place the print element actuators in a position to allow characters to be printed in serial manner and this placement requires that the print wires, nozzles, electrodes or other like print actuators be very closely spaced with respect to each other. Since the print actuators are generally larger in size than the diameter of the printed dot, a relatively long wire, channel or like element must be provided to bring the desired print activity from its source, such as a moving armature or plunger or a pressure generating piezoelectric crystal or the like, to a vertical, closely-spaced, column arranged in a pattern such that a column of closely-spaced tangentially coincident or overlapping dots will be produced on the record media if all actuators are fired or actuated at one time. However, it is likely seen that the use of long wires or channels are known to lower the performance of the actuators.

Since it is desirable to eliminate the long curving transition section between the drive elements and the nozzles, as in the case of the circular arrangement mentioned above, it is proposed to provide an array of ink jet transducers in a spaced configuration or manner for use in a compact print head.

Representative documentation in the field of ink jet print heads and in energization thereof includes U.S. Pat. No. 3,397,345, issued to R. J. Dunlavey on Aug. 13, 1968, which discloses an electrode assembly for ink fluid transfer devices wherein a plurality of electrode structures are formed by etching plates of copper-clad glass and making electrical strapping connections between selected electrodes.

U.S. Pat. No. 3,832,579, issued to J. P. Arndt on Aug. 27, 1974, discloses a well-known pulsed droplet ejecting system wherein a liquid carrying conduit includes a portion capable of conducting pressure waves in the liquid by means of an electro-acoustic transducer having leads surrounding the conduit portions and pulsed for causing ejection of droplets from the nozzle.

U.S. Pat. No. 4,180,225, issued to T. Yamada on Dec. 25, 1979, discloses an ink jet recorder which has an inner metal electrode and an outer metal electrode attached to either side of a ceramic wall end of the reservoir around the outlet thereof. A voltage is applied to the electrodes to provide a vibration to the ink stream for ejection of ink from an orifice in the outer electrode.

SUMMARY OF THE INVENTION

The present invention relates to ink jet printers and, more particularly, to an array of ink droplet drive elements or transducers arranged in a compact configuration. In accordance with the present invention, there is provided a print head support in the form of a circuit board which carries a plurality of the drive elements or transducers in closely-knit and compact manner. The drive elements include piezoelectric or like crystal elements which are pulsed or energized by use of portions operably associated with and forming a part of the circuit board. The drive elements also include a coaxial nozzle formed with an orifice to generate or create the ink droplets by the pulse-on-demand method.

The circuit board includes a plurality of apertures therethrough and arranged in an inclined, symmetrical pattern and equally spaced to hold the piezoelectric drive elements in position and to enable serial printing of dot matrix characters during travel of the printing mechanism in one direction. Each of the piezoelectric drive elements is secured to the circuit board by soldering the outside diameter portion of the piezoelectric crystal to a copper-coated surface of the circuit board after placing the glass tubular portion of the drive element through an aperture in the circuit board. The other surface of the circuit board includes a plurality of copper runs, each of such copper runs being positioned for connection to the terminal or solder tab of a respective drive element.

In view of the above discussion, the principal object of the present invention is to provide an ink jet print head for generating droplets of ink on demand.

Another object of the present invention is to provide an ink jet print head of compact design having a plurality of ink droplet-producing elements or devices.

An additional object of the present invention is to provide means for supporting a plurality of ink droplet-producing elements in a compact symmetrical arrangement.

A further object of the present invention is to provide a substrate having conductive material on the surfaces thereof for use in pulsing a plurality of ink droplet-producing elements secured thereto.

Additional advantages and features of the present invention will become apparent and fully understood from a reading of the following description taken together with the annexed drawing.

DESCRIPTION OF THE PREFERRED EMBODIMENT

Figure 1:
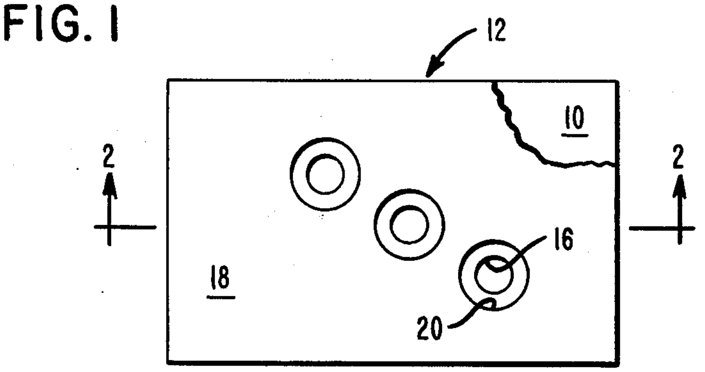
FIG. 1 is a view of one surface of a substrate having a plurality of apertures therethrough and a coating of conductive material thereon.
Figure 2:
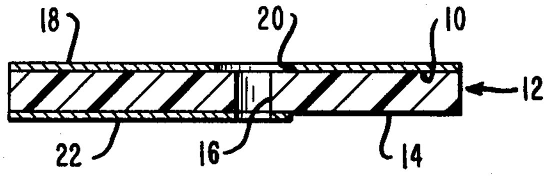
FIG. 2 is a sectional view taken on the line 2—2 of FIG. 1.
Figure 3:
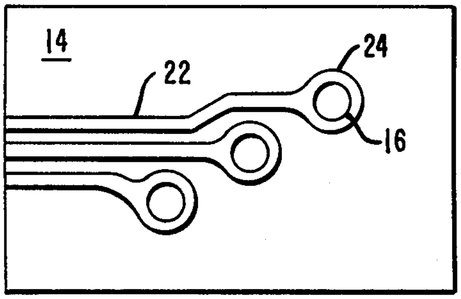
FIG. 3 is a view of the opposite surface of the substrate and showing runs of conductive material thereon.

Referring now to the drawing, FIGS. 1, 2 and 3, respectively, illustrate one surface 10 of a substrate 12, a section taken on the line 2—2 therethrough, and the opposite surface 14 of the substrate. The substrate 12 has three apertures 16 therethrough in an inclined, closely-spaced, symmetrical pattern for receiving three ink jet printing transducers or spritzers which may be of the type described in U.S. Pat. No. 3,832,579, mentioned above.

The surface 10 of the substrate 12 is copper-clad or like covered or coated with a layer 18 of copper, except for a circular portion 20 surrounding each of the apertures 16. The layer 18 of copper thus is commonly associated with the apertures 16, however spaced therefrom by the circular portion 20 to provide for seating the transducers on the substrate 12, as later described. The opposite surface 14 has three runs 22 of copper secured thereto, spaced from each other, with each run terminating in a ring 24 surrounding the respective aperture 16. Each run 22 of copper is associated with its respective aperture 16 for connection with a transducer.

Figure 4:
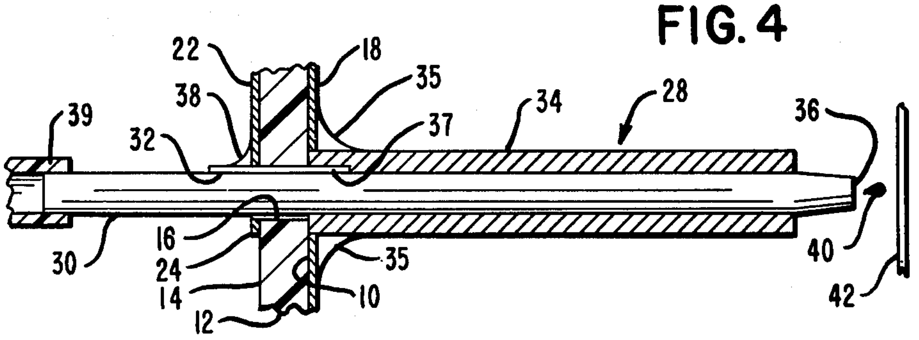
FIG. 4 is an assembly, partially in section, of an ink droplet-producing element and incorporating the features of the present invention.

FIG. 4 shows the assembly of one of the three spritzers or transducers 28 to be carried by the substrate 12, which includes a glass capillary tube 30, a solder tab 32 and a piezoelectric crystal or like element 34. The glass tube 30 is usually connected in suitable manner to a supply of ink through conduit means 39, which may be flexible tubing. The piezoelectric element 34 surrounds the tube 30 substantially the length thereof but just short of the nozzle 36. The solder tab 32 is secured to the tube 30 and located in a space formed by a removed interior or cut-out portion 37 on the inside diameter of the crystal 34. The unclad circular portion 20 of the surface 10 of the substrate 12 is sized to fit the outer diameter of the crystal 34 and to permit soldering therearound so that the copper layer 18 is common to the exterior portion or outside diameter of all spritzers 28. The crystal 34 is soldered as at 35 to the copper layer 18 adjacent and around the outside diameter portion of the crystal, and the tab 32 is soldered as at 38 to the respective copper run 22. The effect of the solder connections 35 and 38 is that the three spritzers 28 are securely fastened to the substrate 12 in an arrangement for operation as a multiple-element print head. The exterior portion or outside diameter of each crystal 34 is one pole surface connected with the layer 18 of copper and the interior portion or diameter is the other pole surface connected through the tab 32 with its respective copper ring 24. In well-known manner, the ink is caused to flow through the ink supply conduit 39 and into the glass tube 30, and the crystal 34 then is pulsed on demand to cause ejection of a droplet 40 of ink onto paper or like record media 42. Suitable and appropriate connections may be effected by use of cardedge connectors operably associated with the copper layer 18 on the surface 10 of the substrate 12 and with the several copper runs 22 on the surface 14 of the substrate for pulsing the crystal 34 in printing operation.

It is thus seen that herein shown and described is a novel way of supplying an electrical pulse to the outside diameter and to the inside diameter pole surfaces of an ink jet spritzer or transducer for operating same and for supporting the several spritzers by means of a substrate in an arrangement for multiple-element printing operation. The apparatus of the present invention enables the accomplishment of the objects and advantages mentioned above, and while a preferred embodiment has been disclosed herein, variations thereof may occur to those skilled in the art. It is contemplated that all such variations not departing from the spirit and scope of the invention hereof are to be construed in accordance with the following claims.

I claim:

1. An ink jet print head arrangement comprising a substrate having a plurality of apertures therethrough, conductive material on one surface of the substrate and commonly associated with the apertures in a manner surrounding thereof, conductive material on the opposite surface of the substrate and individually associated with the apertures, and an ink droplet ejection member carried by the substrate and actuated in pulse manner through the conductive material for printing operation, said ejection member having an elongated ink supply portion extending through one of said apertures, a piezoelectric element surrounding said portion on one side of the substrate, and connection means secured to said portion and to said element and extending through said one of said apertures, said member being operably associated with the conductive material on both sides of the substrate.

2. The arrangement of claim 1 wherein the plurality of apertures are disposed in an inclined symmetrical pattern.

3. The arrangement of claim 1 wherein the conductive material on said one surface comprises a layer of copper common to an outer portion of each ink droplet ejection member.

4. The arrangement of claim 1 wherein the conductive material on said opposite surface comprises a run of copper connected to an inner portion of each ink droplet ejection member.

5. The arrangement of claim 1 wherein each ink droplet ejection member includes an ink supply tube extending through a respective aperture, and a transducer element secured to said substrate to be carried thereby and connected with the conductive material on both surfaces thereof.

6. The arrangement of claim 1 wherein each ink droplet ejection member includes an exterior pole portion and an interior pole portion, said exterior pole portion being connected to the conductive material on said one surface and said interior pole portion being connected to the conductive material on said opposite surface whereby actuation of the pole portions through the conductive material causes ejection of ink droplets in printing operation.

7. A multiple nozzle print head comprising a planar member having at least two apertures therethrough, a coating of conductive material on one surface of the planar member and commonly associated with the apertures in a manner surrounding thereof, a plurality of runs of conductive material on the opposite surface of the planar member and individually associated with the apertures, and a plurality of ink droplet ejection members supported from the planar member and each having an elongated ink supply portion extending through a respective aperture and a piezoelectric element surrounding said portion on one side of the substrate, and each of said ejection members being operably associated with the conductive material on both surfaces and including a connection member secured to the piezoelectric element and to the elongated portion of each ejection member and extending through the respective aperture and actuated in pulse manner through the conductive material for printing operation.

8. The print head of claim 7 wherein each ink droplet drive element includes a capillary tube extending through a respective aperture and a transducer element operably associated with the tube and actuated for ejecting droplets of ink in printing operation.

9. The print head of claim 7 wherein each ink droplet drive element comprises a tubular transducer and includes an exterior portion connected with the coating of conductive material and an interior portion connected with one of the runs of conductive material for actuation of the transducer.

10. The print head of claim 8 wherein the conductive coating on said one surface comprises a layer of copper common to an exterior portion of each transducer element.

11. The print head of claim 8 wherein each run of conductive material on the opposite surface includes a ring portion connected with an interior portion of each transducer element.

12. The print head of claim 8 wherein each transducer element comprises an exterior pole portion surrounded by the coating of conductive material and connected therewith and an interior pole portion connected with one run of conductive material whereby actuation of the pole portions energizes the transducer element and ejects droplets of ink in printing operation.

* * * * *